(12) United States Patent
Dancy et al.

(10) Patent No.: US 11,122,812 B1
(45) Date of Patent: Sep. 21, 2021

(54) ADJUSTABLE SHRIMP PROCESSING EQUIPMENT

(71) Applicant: GREGOR JONSSON INC., Lake Forest, IL (US)

(72) Inventors: Michael Dancy, Grayslake, IL (US); James Groff, Antioch, IL (US); Kevin Herrera, Grayslake, IL (US)

(73) Assignee: GREGOR JONSSON INC., Lake Forest, IL (US)

( * ) Notice: Subject to any disclaimer, the term of this patent is extended or adjusted under 35 U.S.C. 154(b) by 0 days.

(21) Appl. No.: 16/859,495

(22) Filed: Apr. 27, 2020

(51) Int. Cl.
*A22C 29/00* (2006.01)
*A22C 29/02* (2006.01)

(52) U.S. Cl.
CPC .......... *A22C 29/023* (2013.01); *A22C 29/022* (2013.01); *A22C 29/025* (2013.01); *A22C 29/028* (2013.01)

(58) Field of Classification Search
CPC ..................... A22C 29/00; A22C 29/02; A22C 29/023–29/026
USPC ......................................................... 452/1–6
See application file for complete search history.

(56) References Cited

U.S. PATENT DOCUMENTS

| 4,414,709 | A | * | 11/1983 | Betts | A22C 29/022 452/5 |
| 5,290,199 | A | * | 3/1994 | Morris | A22C 29/022 452/3 |
| 2002/0142714 | A1 | * | 10/2002 | Keith | A22C 29/02 452/3 |
| 2016/0050943 | A1 | * | 2/2016 | Greve | A22C 29/026 452/5 |

* cited by examiner

*Primary Examiner* — Richard T Price, Jr.
(74) *Attorney, Agent, or Firm* — Marshall, Gerstein & Borun LLP

(57) ABSTRACT

A shrimp processing machine includes a frame assembly, a drive assembly coupled therewith, a bracket member, and an adjustable cutting assembly. The adjustable cutting assembly is movable between a raised position and a lowered position and includes a cutting device and an adjustable cam plate operably coupled with the cutting device. The adjustable cam plate has a cam body, an adjustment mechanism, and an engagement region having first, second, and third engagement surfaces. The adjustable cutting assembly is adjustable between a first configuration whereby the cutting device has a slow drop-in rate and a second configuration whereby the cutting device has a fast drop-in rate.

22 Claims, 17 Drawing Sheets

ADJUSTABLE SHRIMP PROCESSING EQUIPMENT

FIELD OF THE DISCLOSURE

The present disclosure generally relates to a machine for processing shrimp and, more particularly, to a semi-automated machine for processing shrimp.

BACKGROUND

Historically, shrimp was processed by hand in preparation of consumer sale and consumption. More recently, various types of automated or semi-automated shrimp processing machines have been implemented in processing facilities which are capable of partially or completely removing a shell of a shrimp, thus readying shrimp meat for sale, cooking, and/or consumption. Some of these machines also have cutting capabilities which can cut the shrimp meat at desired locations. Such machines can reduce overall processing times and provide consistent processing results.

SUMMARY

In some embodiments of the present disclosure, a shrimp processing machine includes a frame assembly, a drive assembly coupled therewith, a bracket member, and an adjustable cutting assembly. The adjustable cutting assembly is movable between a raised position and a lowered position and includes a cutting device and an adjustable cam plate operably coupled with the cutting device. The adjustable cam plate has a cam body, an adjustment mechanism, and an engagement region having first, second, and third engagement surfaces. The adjustable cutting assembly is adjustable between a first configuration whereby the cutting device has a slow drop-in rate and a second configuration whereby the cutting device has a fast drop-in rate.

In some embodiments, the first engagement surface and the second engagement surface cooperate to control the drop-in rate of the adjustable cutting assembly. In some forms, the second engagement surface is a generally planar surface that extends from the first engagement surface at an angle. In these and other examples, the third engagement surface is adapted to control a duration the cutting device contacts the shrimp. The third engagement surface may be a generally curved surface that extends from the second engagement surface.

In some examples, the adjustment mechanism of the adjustable cam plate may include a slot having first and second ends. In some examples, the adjustable cutting assembly may further include a gear member operably coupled with the drive assembly. The gear member may carry a roller that selectively engages the engagement region of the adjustable cam plate to cause the cutting device to move between the raised and lowered positions.

In some forms, the adjustable cutting assembly may further include an arm. The cutting device and the adjustable cam plate may be operably coupled with the arm. Further, in some approaches, the adjustable cutting assembly may include an alignment member having a body and a plurality of elongated fingers. The plurality of elongated fingers may define a gap therebetween to receive at least a portion of the cutting device when the adjustable cutting assembly is in the lowered position.

In some examples, the shrimp support region of the bracket member includes a plurality of raised portions that define an opening therebetween to receive at least a portion of the cutting device when the adjustable cutting assembly is in the lowered position. Further, in some examples, the shrimp support region may include a first end and a second end, wherein the first end has a first curvature and the second end has a second curvature.

In some examples, the cutting device of the cutting assembly includes a blade adapter to selectively couple a first blade or a second blade therewith.

In accordance with a second aspect, an adjustable cutting assembly for a shrimp processing machine includes a cutting device and an adjustable cam plate operably coupled with the cutting device. The adjustable cam plate has a cam body, an adjustment mechanism, and an engagement region having a first engagement surface, a second engagement surface, and a third engagement surface. The adjustable cutting assembly being movable between a raised position and a lowered position. Further, the adjustable cutting assembly is adjustable between a first configuration whereby the cutting device has a slow drop-in rate and a second configuration whereby the cutting device has a fast drop-in rate.

In accordance with a third aspect, a bracket member for a shrimp processing machine includes a body and a shrimp support region. The shrimp support region is adapted to at least partially support at least a portion of a shrimp. The shrimp support region includes a plurality of raised portions that define an opening therebetween to receive at least a portion of a cutting device during operation of the shrimp processing machine.

BRIEF DESCRIPTION OF THE DRAWINGS

The above needs are at least partially met through provision of the shrimp processing device described in the following detailed description, particularly when studied in conjunction with the drawings, wherein.

Figure 1:
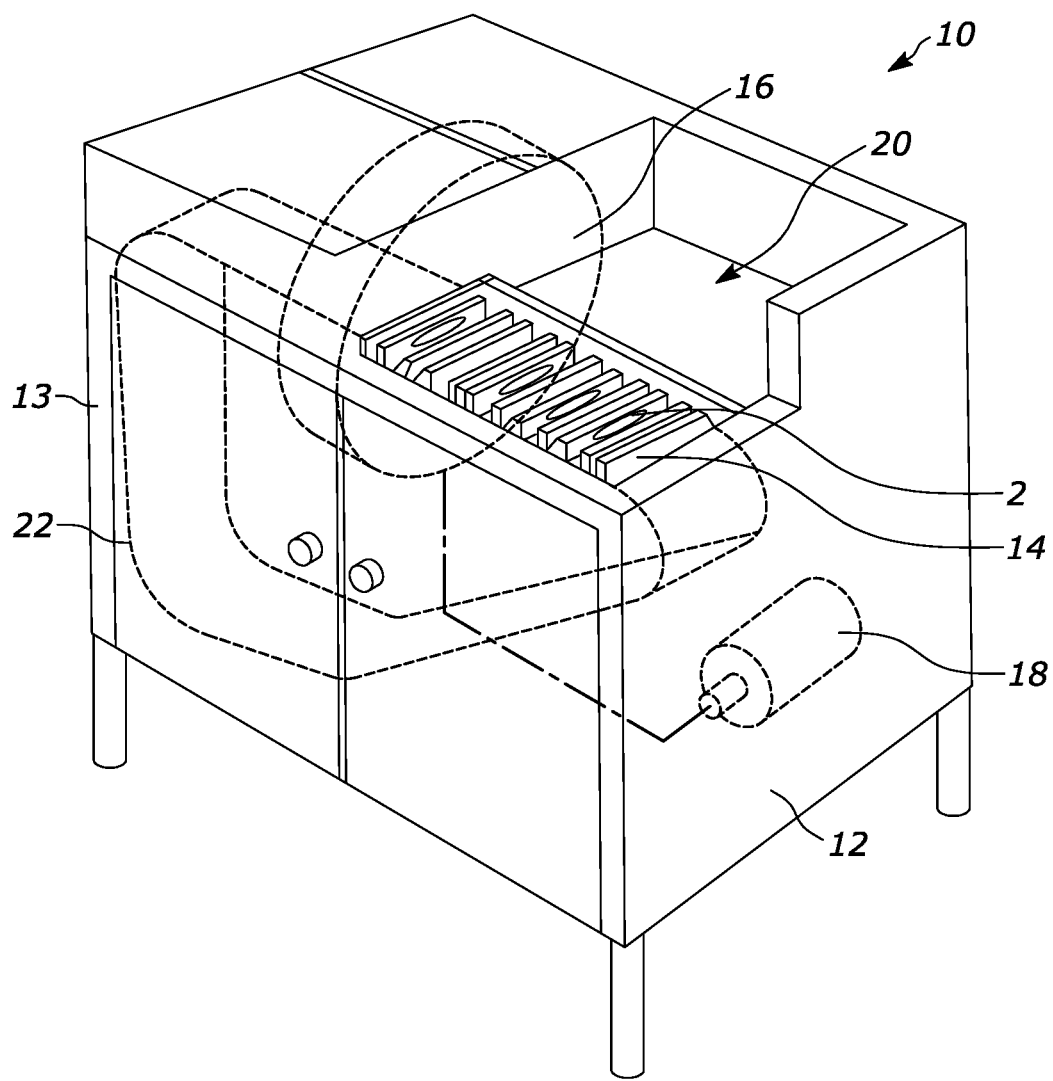
FIG. 1 illustrates a perspective schematic view of an example shrimp processing machine in accordance with various embodiments.
Figure 2:
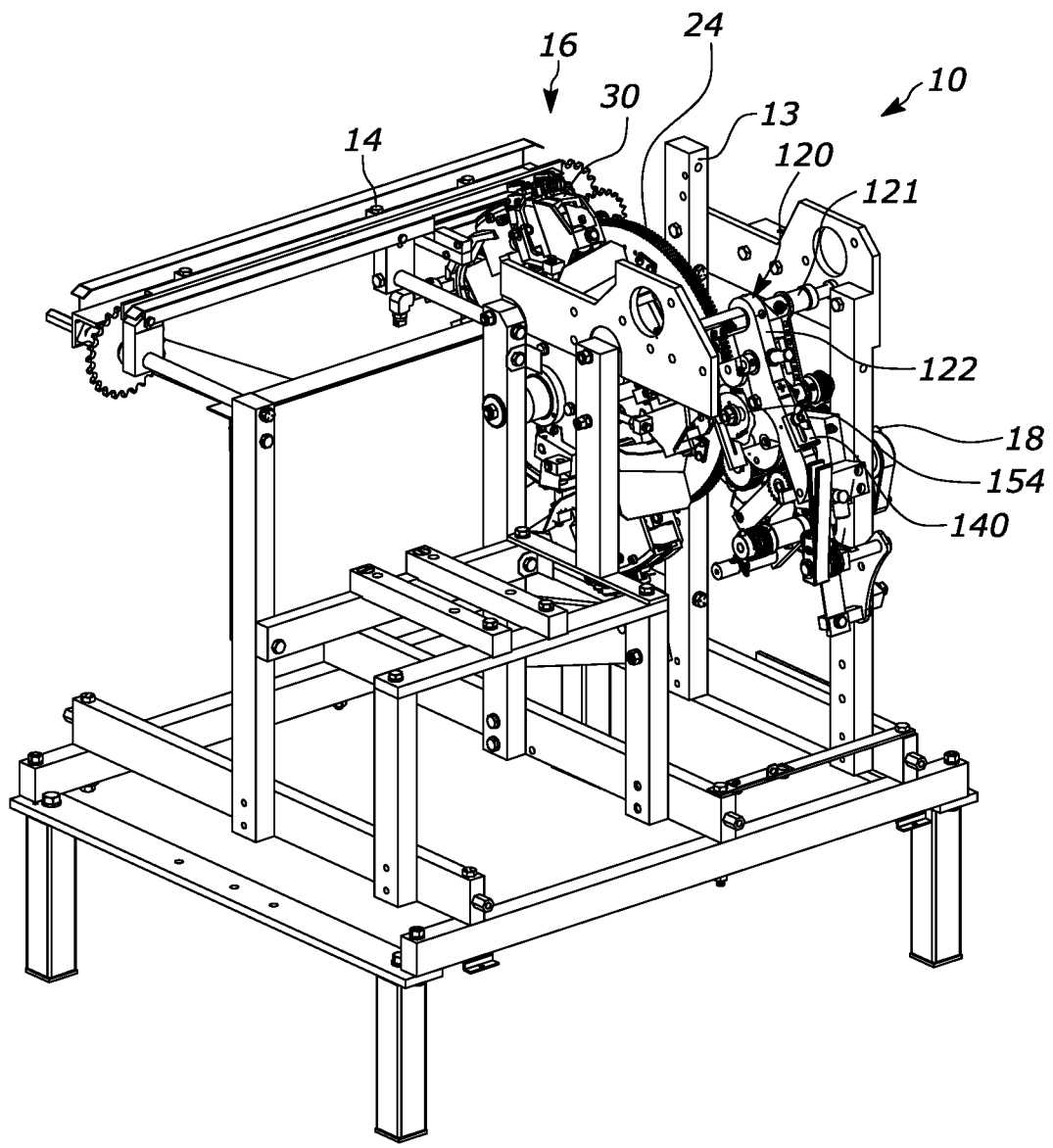
FIG. 2 illustrates a perspective view of the example shrimp processing machine of FIG. 1 having a protective covering removed in accordance with various embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, the present disclosure is directed to an at least semi-automatic shrimp processing machine that is capable of adjustably cutting and picking shrimp. More specifically, the shrimp processing machine is capable of processing the shrimp in a number of unique styles and/or cuts. As a result, processing times may be greatly reduced as compared to previously existing machines. The machine includes a number of adjustable components to selectively cut and process shrimp of varying sizes. An operator may quickly engage the adjustable components to quickly select desired processing settings.

Referring now to the drawings, a shrimp processing machine 10 is constructed in accordance with various embodiments of the present disclosure. The general construction and operation of the machine 10 can be similar to any one or ones of the machines disclosed in the commonly-owned U.S. Pat. No. 2,850,761, filed on May 3, 1956, U.S. Pat. No. 3,214,789, filed on Jan. 28, 1963, U.S. Pat. No. 3,238,561, filed on Mar. 8, 1966, U.S. Pat. No. 3,247,542, filed on Apr. 26, 1966, U.S. Pat. No. 6,533,651, filed on Mar. 27, 2001, U.S. Pat. No. 6,485,363, filed on Mar. 27, 2001, U.S. Pat. No. 7,867,067, filed on Mar. 12, 2009, U.S. Pat. No. 9,833,005, filed on Jan. 9, 2017, and U.S. Appln. No. 62/987,074, filed on Mar. 9, 2020, the entire contents of each are expressly incorporated herein by reference.

More specifically, the shrimp processing machine 10 includes a housing 12, a frame assembly 13, a number of individual loading trays 14, and a processing assembly 16 operably coupled with the frame assembly 13. Further, the shrimp processing machine 10 includes a motor 18 coupled with a motor gear axle. The housing 12 defines a hopper 20 for receiving unprocessed shrimp 2. The individual loading trays 14 are positioned on a conveyor 22 and move adjacent to the hopper 20. The motor 18 actuates the conveyor 22 and the processing assembly 16 such that during operation, shrimp carried on the loading trays are delivered to the processing assembly 16 for processing.

The processing assembly 16 includes a drive assembly 24 in the form of a main gear, any number of individual shrimp clamp assemblies 30 (e.g., between two and eight shrimp clamp assemblies 30), and any number of work stations used to process the shrimp 2. The drive assembly 24 is operably coupled with the frame assembly 13 via any number of support members, brackets, arms, and the like. The processing assembly 16 includes a number of work stations such as, for example, an adjustable cutting assembly 120, an adjustable meat picking assembly (not illustrated), a cleaning station (not illustrated), a deveining station (not illustrated), and the like, each of which may be disposed around the main gear 24.

Figure 3:
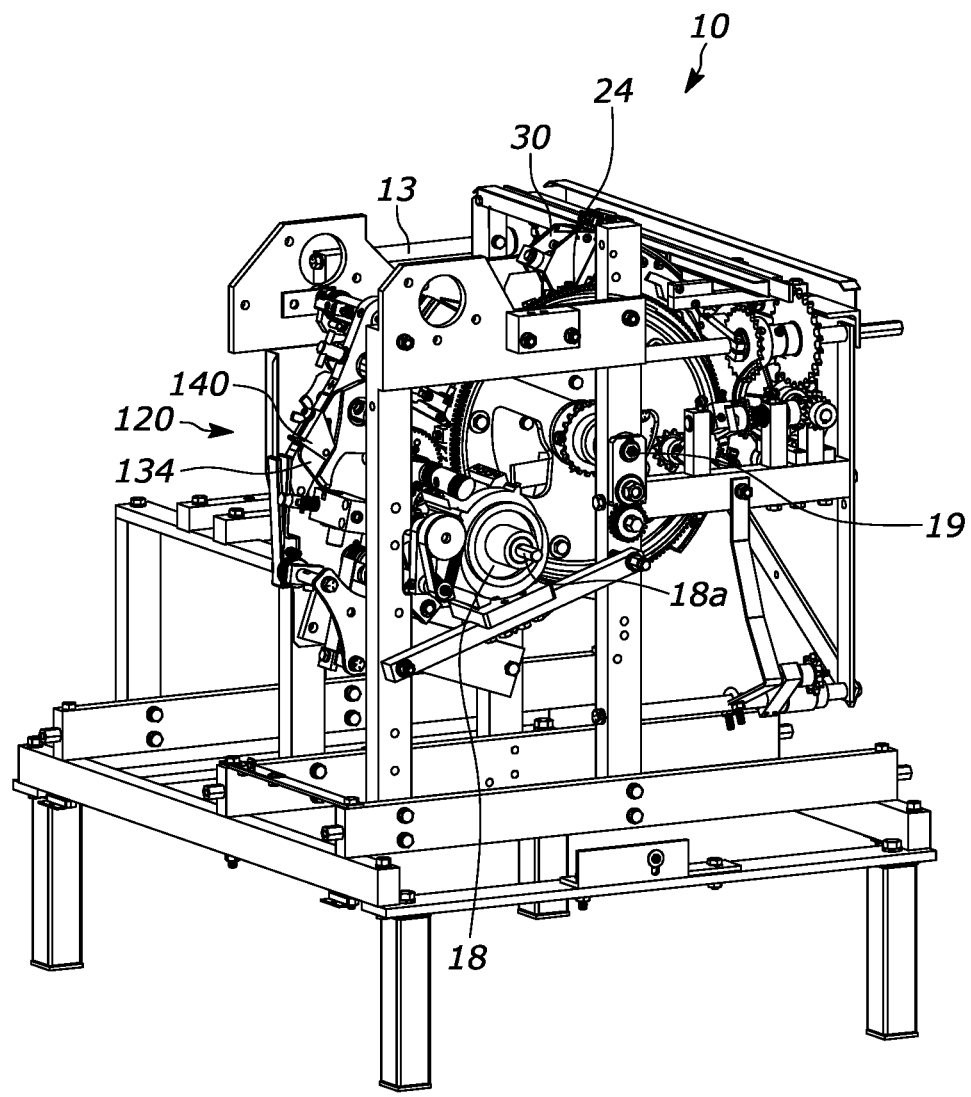
FIG. 3 illustrates a perspective view of the example shrimp processing machine of FIGS. 1 and 2 in accordance with various embodiments.
Figure 4:
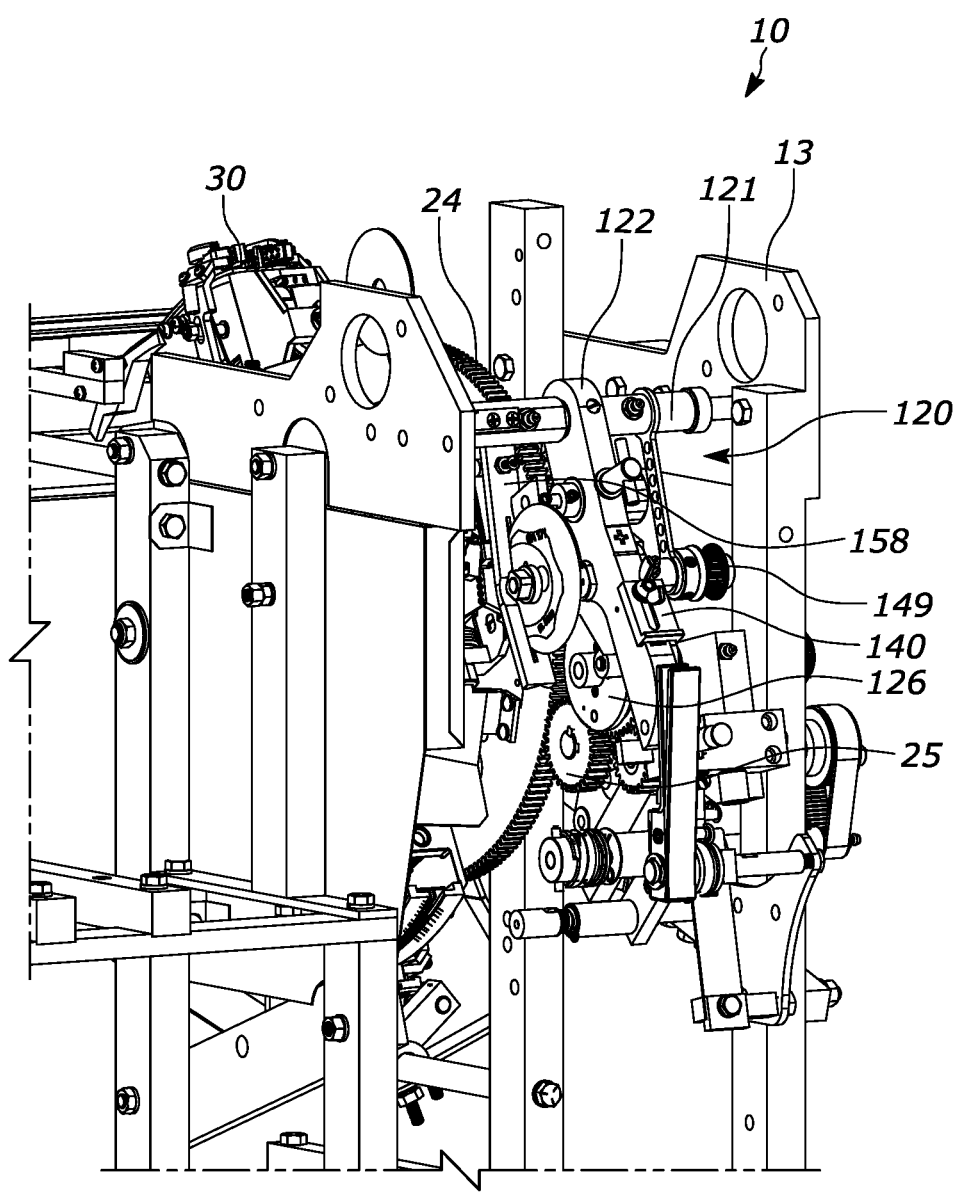
FIG. 4 illustrates a front perspective view of the example shrimp processing machine of FIGS. 1-3 having an example processing assembly in accordance with various embodiments.
Figure 5:
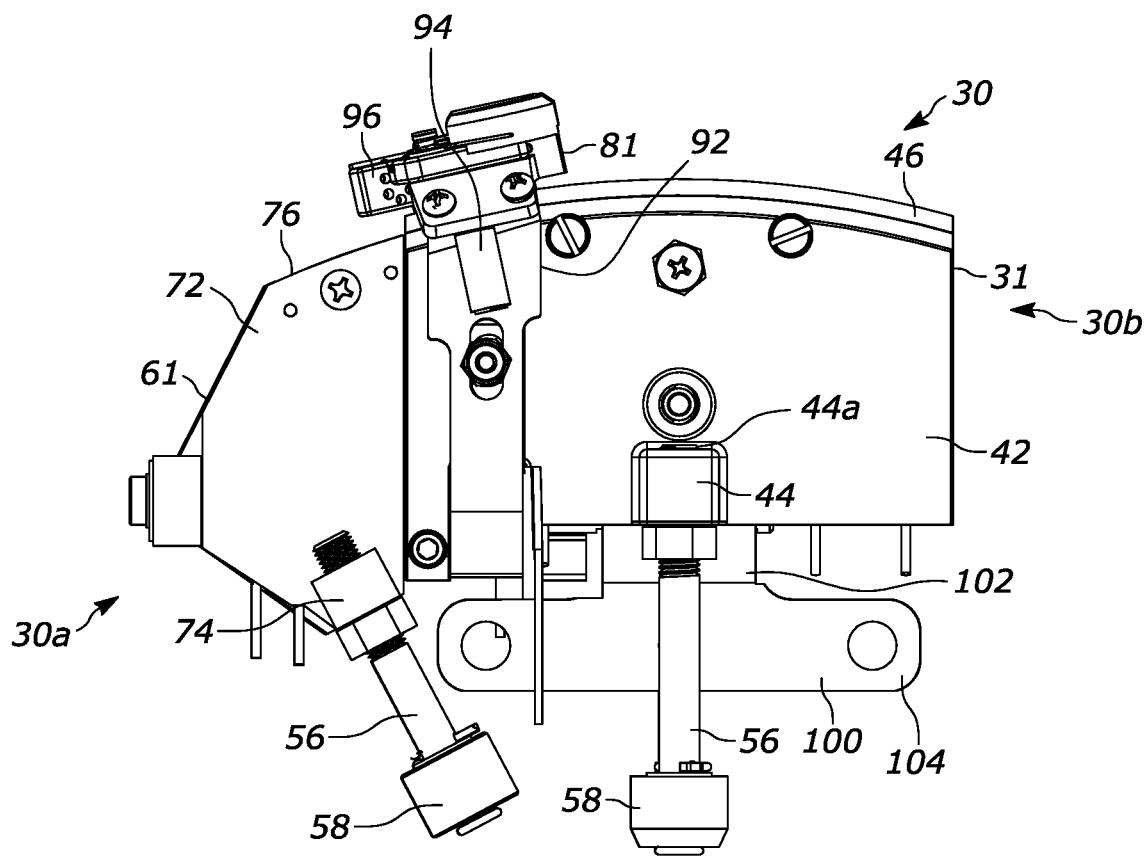
FIG. 5 illustrates a side elevation view of an example clamp mechanism for use with the example shrimp processing machine of FIGS. 1-4 in accordance with various embodiments.
Figure 6:
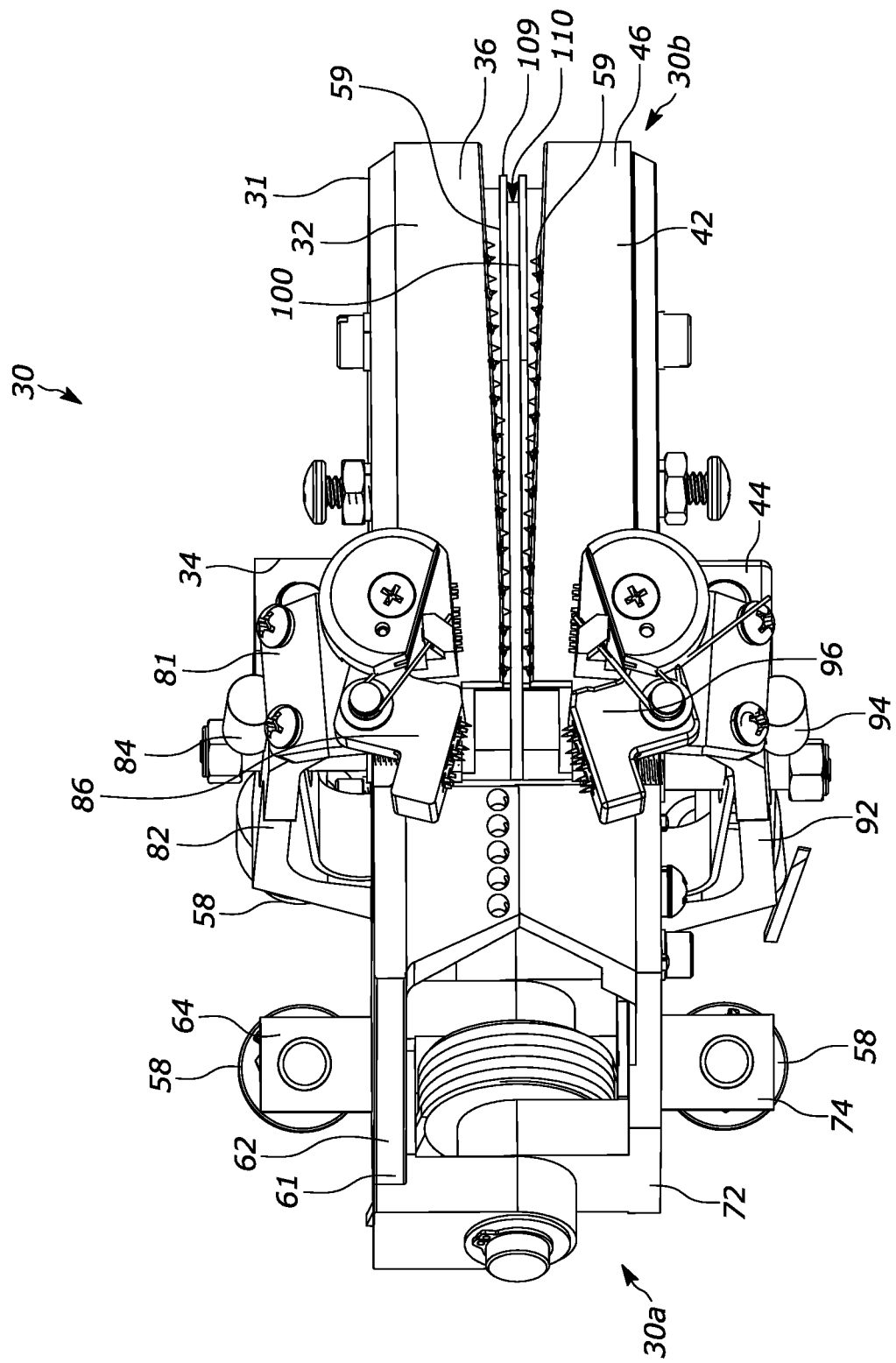
FIG. 6 illustrates a top plan view of the example clamp mechanism of FIG. 5 in accordance with various embodiments.

As illustrated in FIG. 3, the motor 18 is operably coupled with a motor gear 18a via a main gear axle 19, which is operably coupled with the main gear 24 such that it is driven by the motor 18. During operation, the motor 18 drives the motor gear 18a, and thus the main gear 24, thereby causing the main gear 24 to move in a rotational direction. The main gear 24 is coupled with and/or supported by a main gear axle 19.

As the main gear 24 rotates, the shrimp clamp mechanisms 30 pass from beneath the loading trays 14. As each clamp mechanism 30 passes a tray 14, the clamp mechanism 30 grasps the shrimp 2. With the shrimp 2 retained by the clamp mechanism 30, continued rotation of the main gear 24 moves the shrimp 2 towards the work stations (i.e., the adjustable cutting assembly 100 and any other work stations) for processing.

With particular reference to FIGS. 5-10, the clamp mechanism 30 has a first end 30a and a second end 30b and includes a main clamp 31, a small clamp assembly 61, and a tail breaker assembly 81. The main clamp 31 includes a first side plate 32 and a second side plate 42. In the illustrated example, the first and second side plates 32, 42 each includes a lower portion and an upper portion and at least one support flange having an opening that accommodates a clamp rod. So configured, the first and second side plates 32, 42 are each rotatable relative to the clamp rod. Further, each side plate 32, 42 includes a drive arm mounting member 34, 44 positioned at or near the lower portion thereof that includes a bore to receive a drive arm 56 coupled with a bumper 58. The clamp mechanism 30 further includes a number of resilient members (not illustrated) that are configured to cause the upper portions to move inwardly towards each other in a clamping motion.

Each of the first and second side plates 32, 42 includes a clamping surface or portion 36, 46 positioned at or near the upper portion thereof. More specifically, the clamping portions 36, 46 extend along a length (e.g., all or substantially all) of the upper portions of the first and second side plates 32, 42 and face "inwardly" towards each other. In the illustrated examples, the clamping portions 36, 46 are in the form of distinct bracket members that are coupled with the first and second side plates 32, 42, but in other examples, the clamping portions 36, 46 may be integrally formed therewith. The clamping portions 36, 46 include any number of holes to receive clamp pins 59 that are in the form of conical members. In the illustrated examples, the clamping portions 36, 46 include holes that extend across all or substantially all of the length of the clamping portions 36, 46 to receive clamp pins 59. Such a configuration advantageously provides for increased contact with the shrimp 2 at both the body and the head regions, resulting in a more secure retention of the shrimp 2. In other examples, the clamp pins 59 may be in the form of different shapes. Further, in some examples, the clamp pins 59 may be formed integrally with the clamping portions 36, 46.

The small clamp assembly 61 includes a first end plate 62 and a second end plate 72 positioned at the first end 30a of the clamp mechanism 30. The first and second end plates 62, 72 include similar features as the first and second side plates 32, 42. In the illustrated example, the first and second end plates 62, 72 each include a lower portion, an upper portion, at least one support flange having an opening that accommodates a second clamp rod to secure the first and second end plates 62, 72 with the bracket member 100. So configured, the first and second end plates 62, 72 are each rotatable relative to the clamp rod. Further, each of the first and second end plates 62, 72 includes a drive arm mounting member 64, 74 positioned at or near the lower portion thereof that includes a bore to receive additional drive arms 56 coupled with respective bumpers 58. As previously described, any number of torsion springs may be disposed on and/or operably coupled with the clamp rod to engage the first and second end plates 62, 72 to cause the upper portions to move inwardly towards each other in a clamping motion.

Each of the first and second end plates 62, 72 also includes a clamping surface or portion 66, 76 positioned at or near the upper portion thereof. More specifically, the clamping portions 66, 76 extend along a length (e.g., all or substantially all) of the upper portions of the first and second end plates 62, 72 and face "inwardly" towards each other. In the illustrated examples, the clamping portions 66, 76 are in the form of distinct bracket members that are coupled with the first and second end plates 62, 72, but in other examples, the clamping portions 66, 76 may be integrally formed therewith. The clamping portions 66, 76 include any number of holes to receive the previously-described clamp pins 59. In some examples, the clamp pins 59 may be formed integrally with the clamping portions 64, 74.

The tail breaker assembly 81 includes a first breaker arm 82 and a second breaker arm 92 positioned near the first end 30a of the clamp mechanism 30. The first and second breaker arms 82, 92 include similar features as the first and second side plates 32, 42 and the first and second end plates 62, 72. In the illustrated example, the first and second breaker arms 82, 92 each include a lower portion, an upper portion, a first coupling portion in the form of an opening that accommodates a first coupling member to rotatably couple the first and second side plates 32, 42, respectively, therewith, and a second coupling portion in the form of an opening that accommodates a second coupling member to further couple the first and second side plates 32, 42, respectively, and to limit relative rotation therebetween. So configured, the first and second breaker arms 82, 92 are each rotatable relative to the first and second side plates 32, 42. Further, each of the first and second breaker arms 82, 92 includes an engaging arm member 84, 94 positioned at or near the upper portion. A number of resilient members may be operably coupled with the breaker arms and side plates to urge the upper portions of the first and second breaker arms 82, 92 are urged outwardly such that the first and second breaker arms 82, 92 pivot about the first coupling member, thus having an open resting configuration.

Each of the first and second breaker arms 82, 92 also includes a clamping surface or portion 86, 96 positioned at or near the upper portion thereof. More specifically, the clamping portions 86, 96 extend along a length (e.g., all or substantially all) of the upper portions of the first and second breaker arms 82, 92 and face "inwardly" towards each other. In the illustrated examples, the clamping portions 86, 96 are in the form of distinct bracket members that are coupled with the first and second breaker arms 82, 92, but in other examples, the clamping portions 86, 96 may be integrally formed therewith. The clamping portions 86, 96 include any number of holes to receive the previously-described clamp pins 59. In some examples, the clamp pins 59 may be formed integrally with the clamping portions 84, 94. The clamping portions 86, 96 are segmented into two sections that are rotatable relative to each other to break the shell of the shrimp, thus separating the shrimp shell from the tail shell.

As previously described, each of the first and second side plates 32, 42, the first and second end plates 62, 72, and the first and second breaker arms 82, 92 are movable relative to each other and are spring loaded via respective springs such that the main clamp 31 and end clamp 62 are biased towards a closed position, and the tail breaker assembly 81 is biased towards an open position. In this configuration, the clamp pins 59 clamp and retain the shrimp 2 within the clamp mechanism 30.

With particular reference to FIGS. 7-10, the clamp mechanism 30 of the processing assembly 16 further includes a number of bracket members 100 each being operably coupled with the main gear 24 and the clamp mechanism 30. The bracket member 100 is generally anvil shaped and includes a body 102 having a base 104 and shrimp support region 106. The base 104 includes any number of mounting members in the form of bores 108 to receive bolts or pins (not illustrated) used to couple the bracket member 100 with the main gear 24. In some examples, the main gear 24 may include a mounting plate (not illustrated) to which the bracket members 100 may be operably coupled. The body 102 further includes rod bores (not illustrated) to receive the clamp rods used to couple the clamp mechanism 30 therewith.

Figure 7:
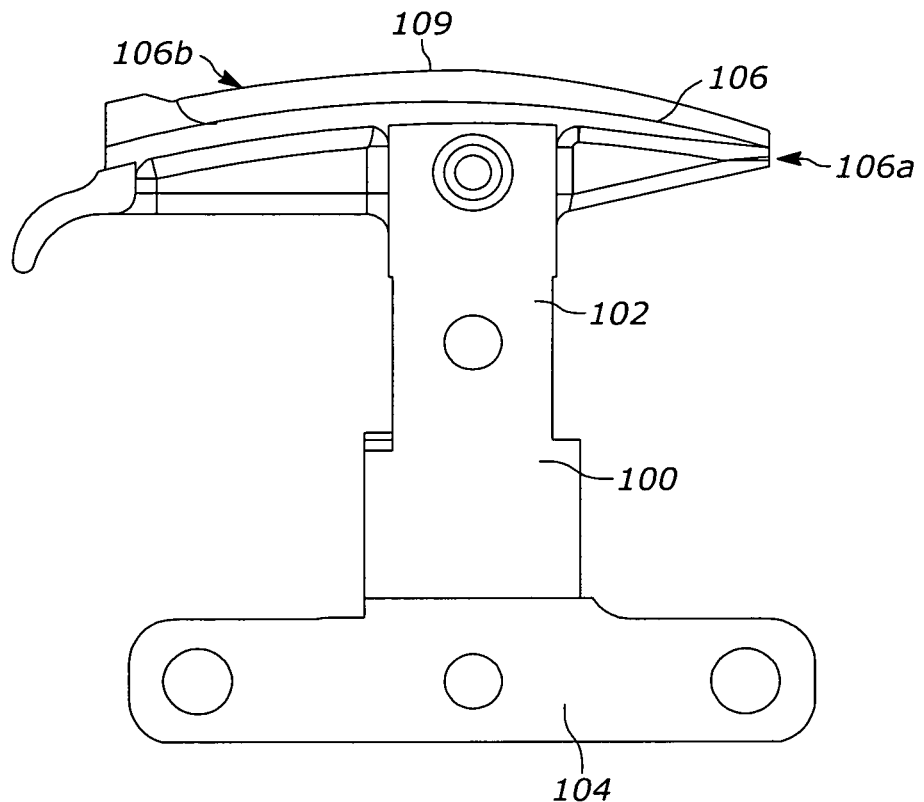
FIG. 7 illustrates a side elevation view of an example bracket member for use in the example processing assembly of FIGS. 4-6 in accordance with various embodiments.
Figure 8:
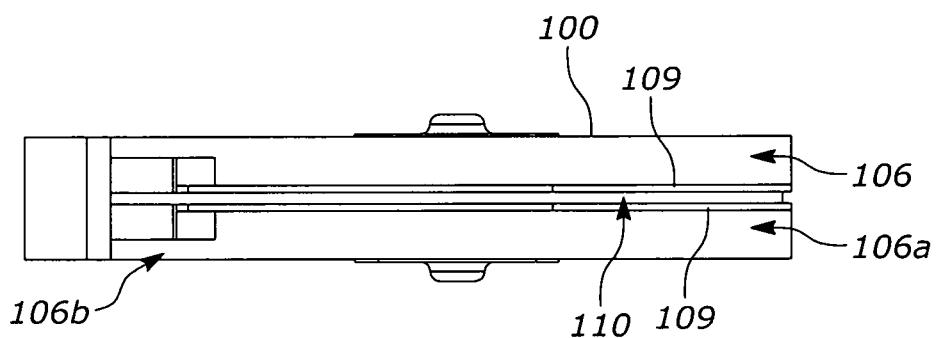
FIG. 8 illustrates a top plan view of the example bracket member of FIG. 7 in accordance with various embodiments.
Figure 9:
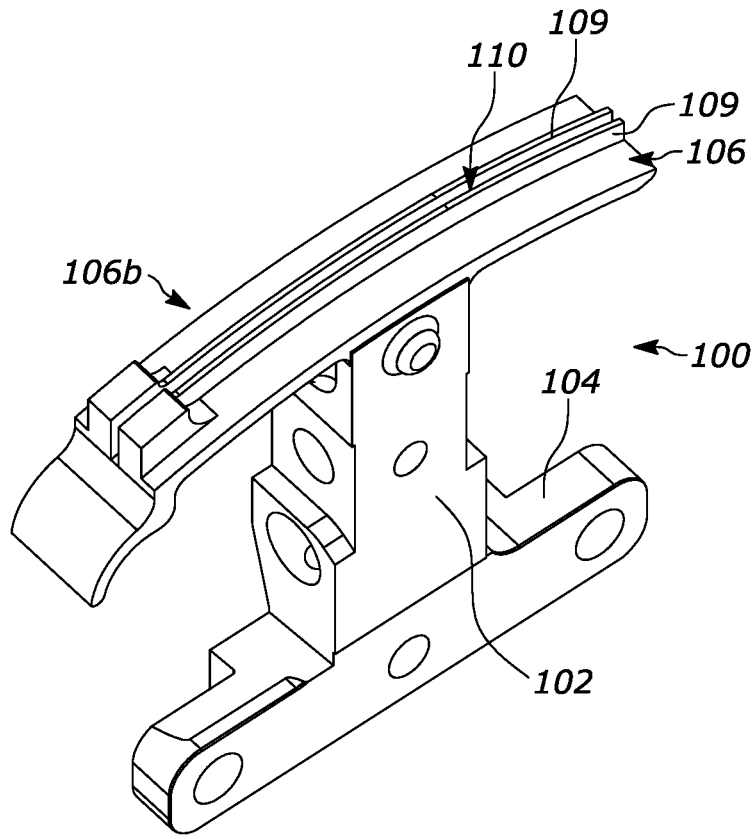
FIG. 9 illustrates an upper perspective view of the example bracket member of FIGS. 7 and 8 in accordance with various embodiments
Figure 10:
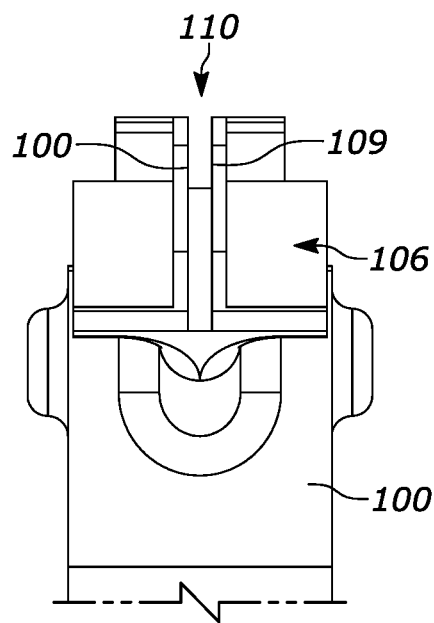
FIG. 10 illustrates a front elevation view of the example bracket member of FIGS. 7-9 in accordance with various embodiments.

The shrimp support region 106 defines a surface or surfaces the shrimp 2 is disposed on during processing. The shrimp support region 106 includes a generally curved surface having a first end 106a and a second end 106b. As illustrated in FIG. 7, the first end 106a of the shrimp support region 106 has a different curvature than the second end 106b thereof. More specifically, the first end 106a has a smaller radius of curvature than the second end 106b to assist in properly seating and retaining the shrimp 2 within the main clamp 31.

The shrimp support region 106 further includes a number of raised portions 109 extending therefrom that are separated by a central opening or groove 110. In some examples, the groove 110 extends to a depth that is below the support surface of the shrimp support region 106. Other arrangements are possible. Notably, by providing a raised groove arrangement, the shrimp 2 may be cut in a number of styles such as a Western cut where the cutting device or blade may drop into the groove 110 to fully cut the shrimp 2 while the cutting device avoids contact with the bracket member 100. Further, the raised protrusion 109 provide an advantageous profile and height in relation to the clamp pins 59. More specifically, the raised portions 109 allow the clamp pins 59 to more securely retain the shrimp 2, thus assisting in properly positioning the shrimp 2 relative to the clamp assembly 30.

With reference to FIGS. 11-18, the adjustable cutting assembly 120 includes an arm 122, a drive gear 126 having at least one roller 130 coupled thereto, an adjustable cam plate 134, and a cutting device 146. The arm 122 includes a body 123 and is rotatably mounted with the frame assembly 13 via a generally cylindrical pivot rod 121 inserted through a frame mounting bore 123a. The pivot rod 121 engages the arm 122 such that rotation of the arm 122 causes the pivot rod 121 to also rotate. The arm 122 may be operably coupled with the pivot rod 121 via any number of suitable approaches.

The arm 122 also includes a number of additional mounting portions to receive the adjustable cam plate 134 and the cutting device 146. More specifically, the body 123 includes a second mounting bore 123b that receives a cutter rod 147 which is coupled with the cutting device 146. As will be discussed in further detail, the cutter rod 147 is fixedly coupled with the arm 122 such that rotational movement of the arm 122 causes the cutter rod 147, and thus the cutting device 146, to also rotate. Further, a pin 125 is coupled or formed integrally with the body 123 and projects outwardly therefrom.

Figure 11:
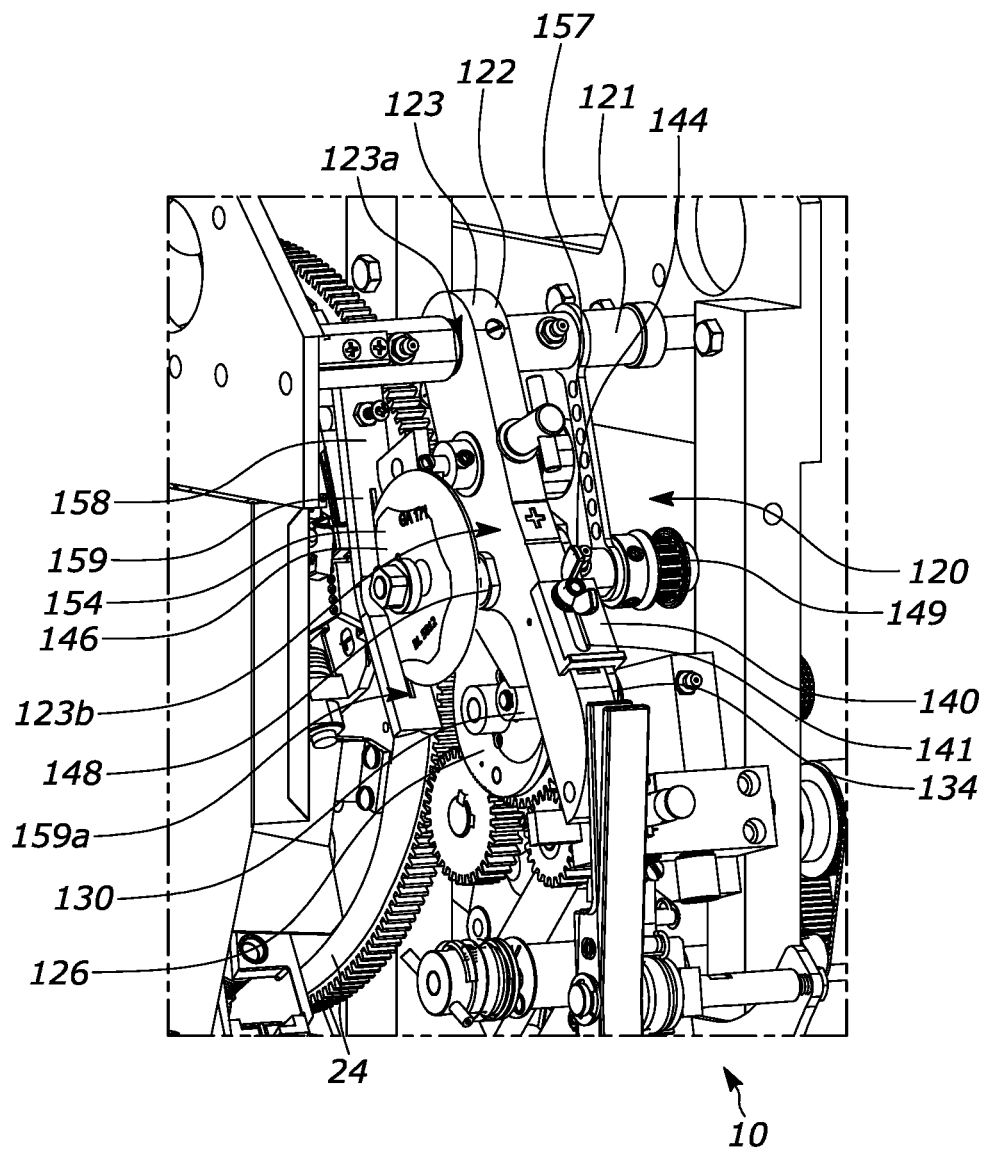
FIG. 11 illustrates a front perspective view of the example processing assembly of FIGS. 4-10 in accordance with various embodiments.
Figure 12:
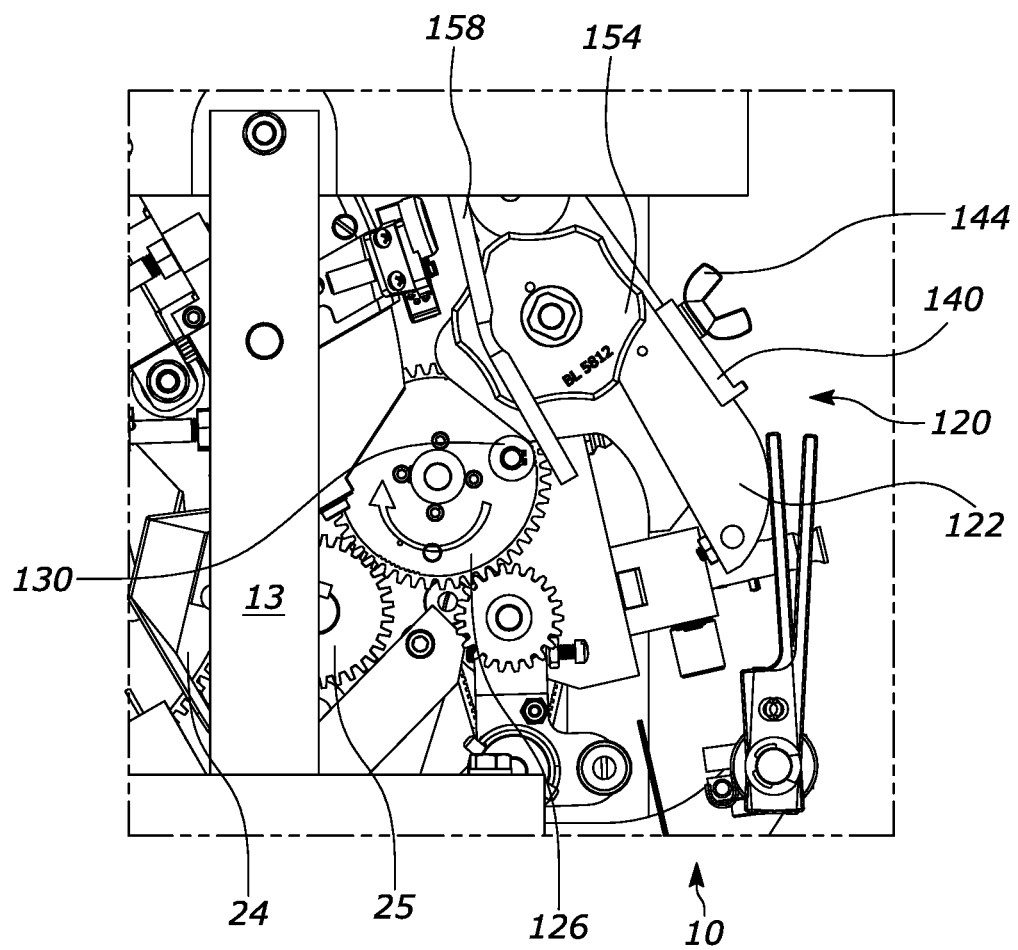
FIG. 12 illustrates a right side elevation view of the example processing assembly of FIGS. 4-11 in accordance with various embodiments.
Figure 13:
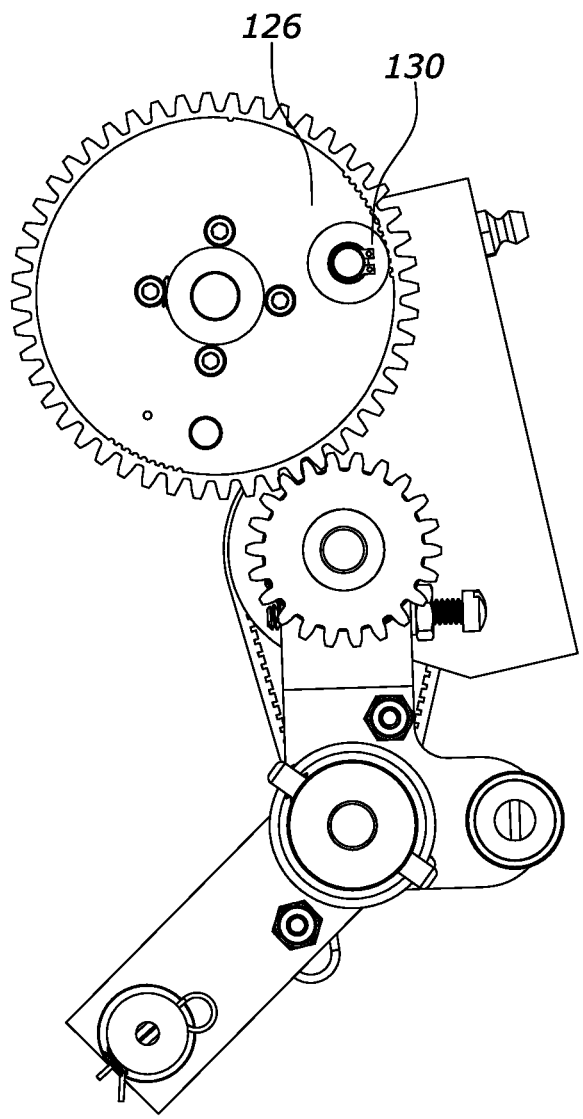
FIG. 13 illustrates a left side elevation view of the example processing assembly of FIGS. 4-12 in accordance with various embodiments.

As illustrated in FIGS. 11 and 12, the drive gear 126 is operably coupled with the main gear 24 via a reduction gear 25. Rotation of the main gear 24 causes the drive gear 126 to rotate in a clockwise direction. This rotation further causes the roller 130 to rotate to selectively engage the adjustable cam plate 134. The drive gear 126 may be coupled with additional gear members used to drive additional components for further processing.

The adjustable cam plate 134 includes a body having an opening or bore 134a through which cutter rod 147 passes, thereby permitting relative rotational movement between the cutter rod 147 and the adjustable cam plate 134. The adjustable cam plate 134 further includes an engagement region 134b having a first engagement surface 135, a second engagement surface 136, and a third engagement surface 137, as well as a mounting slot 138 and a recessed region 139. The engagement region 134b is selectively contacted by the roller 130 to cause the cam plate 134, and thus the arm 122 and cutting device 146 to move to different positions (e.g., raised and lowered positions) during operation of the shrimp processing machine 100. The pin 125 coupled with the body 123 of the arm 122 is slidably disposed within the mounting slot 138 to allow relative movement between the arm 122 and the adjustable cam plate 134.

Figure 15:
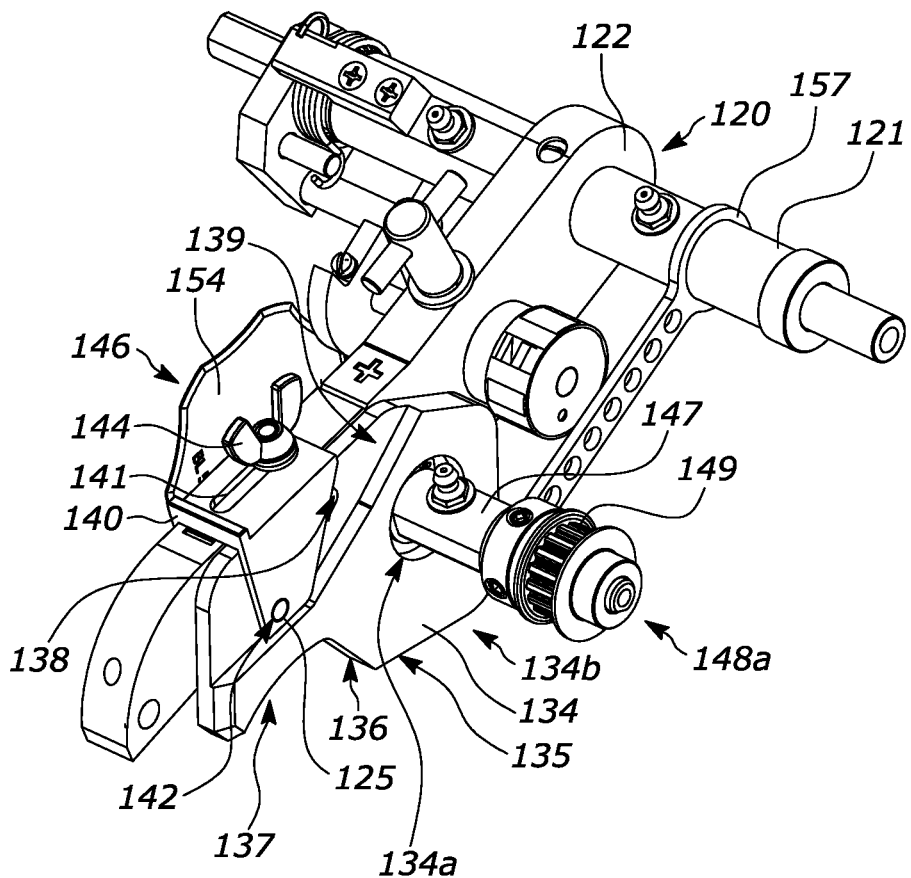
FIG. 15 illustrates a right side perspective view of the example processing assembly of FIGS. 4-14 in accordance with various embodiments.

As illustrated in FIG. 15, a cam plate bracket 140 is provided to movably couple the arm 122 with the adjustable cam plate 134. More specifically, the cam plate bracket 140 includes a body having a slot 141 and a pin bore 142 that receives the pin 125 coupled with the body 123 of the arm 122 to allow for relative translational movement between the arm 122, the adjustable cam plate 134, and the cam plate bracket 140. The slot 141 is configured to receive a wing nut 144 or other securing mechanism to secure the cam plate bracket 140 with the arm 122.

As previously noted, the cutting device 146 includes a cutter rod 147 disposed through the arm 122. The cutter rod 147 is generally hollow, and receives a cutter drive rod 148 having a first end 148a and a second end 148b. The cutter rod 147 has a shorter length than the cutter drive rod 148, and as such, the cutter drive rod 148 extends outwardly from the cutter rod 147. The first end 148a of the cutter drive rod 148 includes a cutter drive gear 149 that is operably coupled with the drive gear 24 via any number of approaches such as, for example, a belt, a series of gears, or the like (not illustrated). Other examples are possible. The cutter drive gear 149 is fixedly coupled with the cutter drive rod 148 such that rotation of the cutter drive gear 149 causes the cutter drive rod 148 to also rotate.

Figure 14:
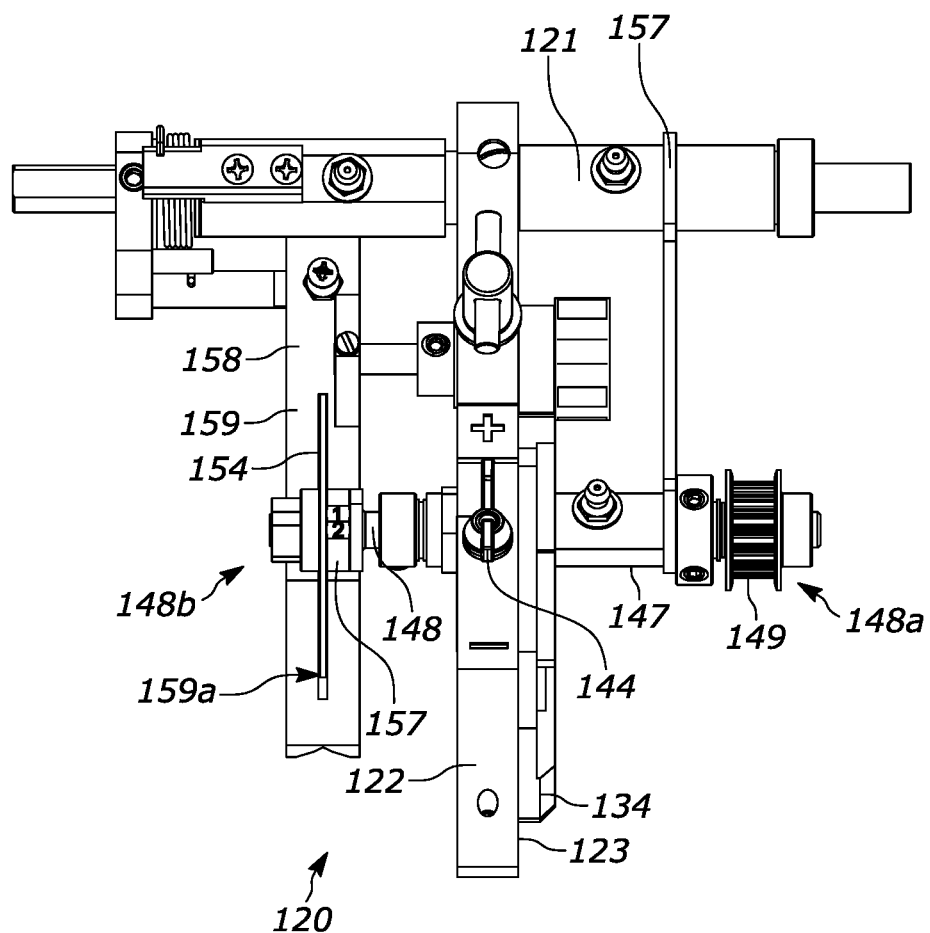
FIG. 14 illustrates an upper perspective view of the example processing assembly of FIGS. 4-13 in accordance with various embodiments.
Figure 19:
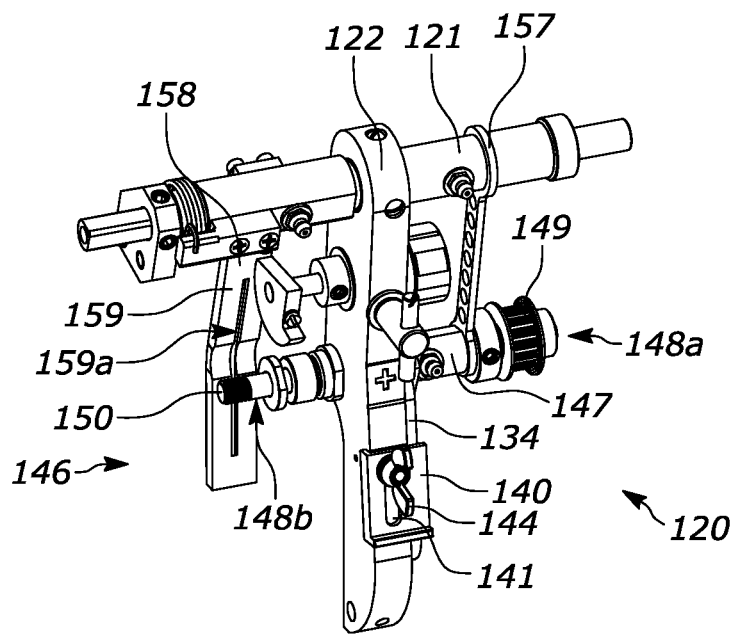
FIG. 19 illustrates a rear perspective view of the example processing assembly of FIGS. 4-18 in accordance with various embodiments.
Figure 20:
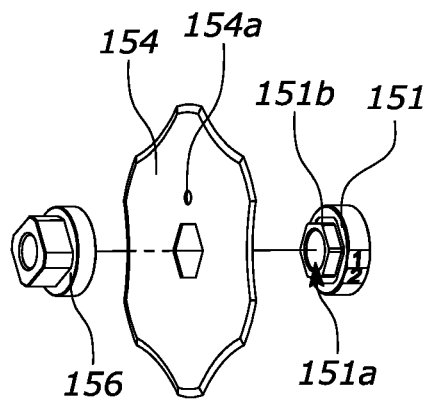
FIG. 20 illustrates a perspective view of an example cutting device for use with the example shrimp processing assembly of FIGS. 1-19 in accordance with various embodiments.

A blade 154 is operably coupled with the second end 148b of the cutter drive rod 148. More specifically, and as illustrated in FIGS. 14, 19, and 20, the second end 148b of the cutter drive rod 148 receives a cutter blade adapter 151 via an inner bore 151a. In some examples, the inner bore 151a of the cutter blade adapter 151 may be keyed such that it mates with a corresponding surface of the cutter drive rod 148 to cause the cutter drive rod 148 and the cutter blade adapter 151 to rotate together. The cutter blade adapter 151 further includes a blade coupling surface 151b on which the blade 154 is mounted. As illustrated in FIG. 20, the blade coupling surface 151b may be hex-shaped to mate with a corresponding hex-shaped opening of the blade 154. Other examples of suitable shapes are possible.

In some examples and as illustrated in FIG. 20, the blade 154 may be in the form of a primary and secondary blade separated by a spacer 155. The blade 154 may further include a retaining member 154a that receives a retaining pin disposed on the cutter blade adapter 151 to further secure the cutter blade adapter 151 with the blade 154. Other examples of suitable retention mechanisms, such as, for example a reversed arrangement where the blade 154 carries a retaining pin that is inserted into a corresponding opening on the cutter blade adapter 151, are possible. The second end 148b of the cutter drive rod 148 further includes a threaded portion 150 to receive a locking nut 156 to secure the blade 154 onto the cutter drive rod 148. In some examples, the cutting device 146 further includes a brace 157 that couples the pivot rod 121 with the cutter rod 147 and/or the cutter drive rod 148.

Returning to FIGS. 14-18, the engagement region 134b controls timing of movement of the arm 122, thereby controlling timing of movement of the cutting device 146. More specifically, the first engagement surface 135 controls when the cutting device 146 moves to a raised position, the second engagement surface 136 controls a "drop-in" rate of the cutting device 146 (i.e., when and how quickly the cutting device 146 lowers to begin cutting the shrimp 2), and the third engagement surface 137 controls a "dwell time" of the cutting device 146 (i.e., how long and quickly the cutting device 146 raises to cease cutting the shrimp 2). In the illustrated example, the second engagement surface 136 is generally planar and extends at an angle relative to the first engagement surface 135. The third engagement surface 136 is generally curved surface that extends from the second engagement surface 137.

In operation, as the main gear 24 rotates, the shrimp 2, disposed in the loading tray 14, moves towards one of the clamp mechanisms 30, which rotates along with the main gear 24. The clamp mechanism 30 then retains the shrimp 2, and continues movement along the main gear 24. Further, the drive gear 126 and the roller 130 rotate in a clockwise direction (relative to the views illustrated in FIGS. 12 and 13). At this time, the shrimp 2, carried by the clamp mechanism 30, advances towards the adjustable cutting assembly 120. Continued rotation of the drive gear 126 causes the roller 130 to contact and engage the first engagement surface 135 of the adjustable cam plate 134, which in turn urges the adjustable cam plate 134 upwards. Because the adjustable cam plate 134 is coupled with the arm 122, which is in turn coupled with the cutting device 146, the arm 122 and cutting device 146 also rotate upwards about the pivot rod 121 to a raised position.

The roller 130 continues to move along the length of the first engagement surface 135 until it contacts the second engagement surface 136. This movement causes the adjustable cam plate 134, the arm 122, and the cutting device 146 to "drop-in" or rotate downwardly about the pivot arm 121 to a lowered position. At or before this time, the cutter drive gear 149 may be engaged to cause the cutter drive rod 148 to rotate, thereby rotating the blade 154 to begin cutting the shrimp 2. The depth of the cut and the drop-in rate of the blade 154 are determined by the length of the second engagement surface 136 and the relative angle between the first and second engagement surfaces 135, 136.

The roller 130 continues to move along the length of the second engagement surface 136 until it contacts the third engagement surface 137. This movement causes the adjustable cam plate 134, the arm 122, and the cutting device 146 to again rotate upwardly about the pivot arm 121. The blade 154 continues cutting the shrimp 2 while the clamp mechanism 30 advances the blade 154 towards the head of the shrimp 2. Further, the curvature of the third engagement surface 136 causes the depth of the blade 154, and thus the cut, to slowly decrease until the roller 130 disengages from the third engagement surface 137. At this time, the shrimp 2 advances to a subsequent working station for further processing. The dwell time of the blade 154 is determined by the length and curvature of the third engagement surface 137 and the relative angle between the second and third engagement surfaces 136, 137.

Figure 18:
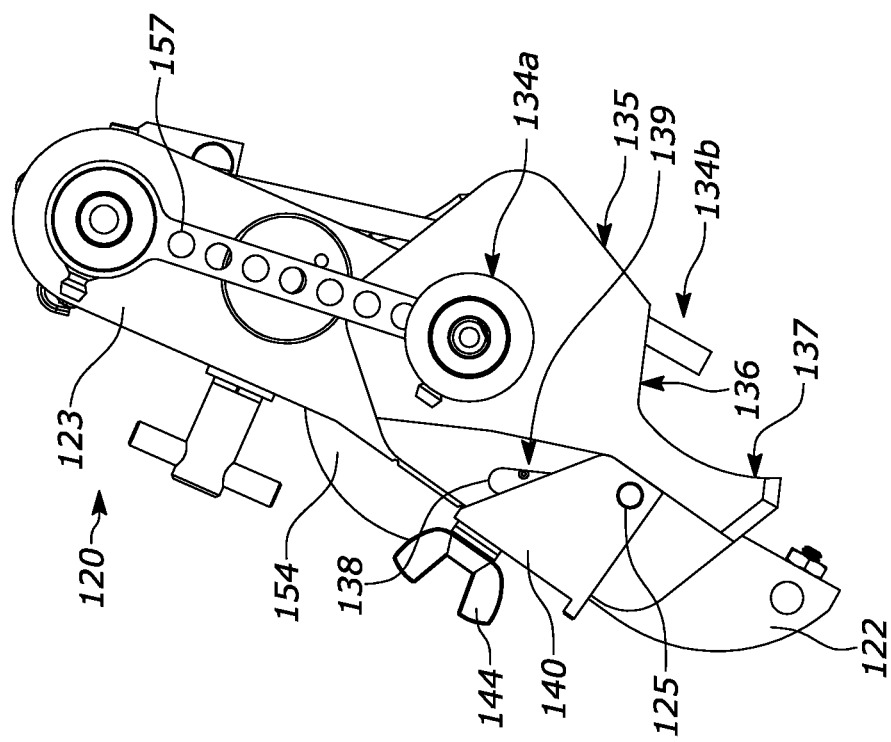
FIG. 18 illustrates a right side elevation view of the example processing assembly of FIGS. 4-17 in a second orientation in accordance with various embodiments.

As previously noted, the adjustable cam plate 134 may be adjusted to change the timing of movement of the arm 122 and the cutting device 146. More specifically and with reference to FIGS. 17 and 18, the adjustable cam plate 134 may be rotated relative to the arm 122 by loosening the wing nut 144 and rotating the adjustable cam plate 134 about the bore 134a. The pin 125, which is inserted into the mounting slot 138, may travel along the length of the mounting slot during this movement. As illustrated in FIG. 18, the adjustable cam plate 134 may be rotated downwardly relative to the arm 122, and this (and any other) relative positioning may be retained by tightening the wing nut 144 to secure the cam plate bracket 140. The cam plate bracket 140 may freely rotate within the recessed region 139 of the adjustable cam plate 134.

As a result of the adjustability of the adjustable cam plate 134, the timing of the adjustable cutting assembly 120 may be modified. More specifically, in the configuration illustrated in FIG. 17, engagement between the roller 130 and the engagement region 134b of the adjustable cam plate 134 causes the adjustable cutting assembly 120, and particularly the blade 154, to drop in at the fastest rate while quickly becoming disengaged from the shrimp 2. Such an arrangement will cause the blade 154 to cut the shrimp 2 at or near the joint for a clean Western-style cut. Conversely, in the configuration illustrated in FIG. 18, the engagement between the roller 130 and the engagement region 134 of the adjustable cam plate 134 causes the adjustable cutting assembly, and particularly the blade 154, to drop in at a relatively slower rate and remain engaged with the shrimp 2 for a longer time (i.e., having a longer dwell time). In such a configuration, the blade 154 may gradually change depths when approaching the shrimp head. As a result, the adjustable cutting assembly 120 may quickly enable a user to select between desired cutting styles such as, for example, gradual cut butterfly, round butterfly, and the like. Other examples are possible.

Figure 16:
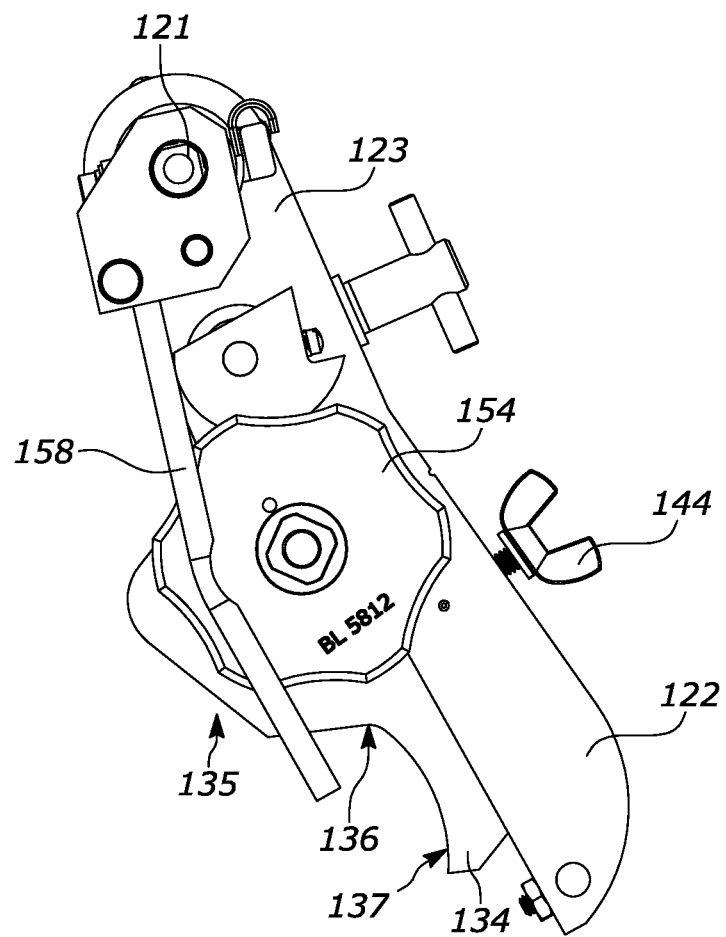
FIG. 16 illustrates a right side elevation view of the example processing assembly of FIGS. 4-15 in accordance with various embodiments.
Figure 17:
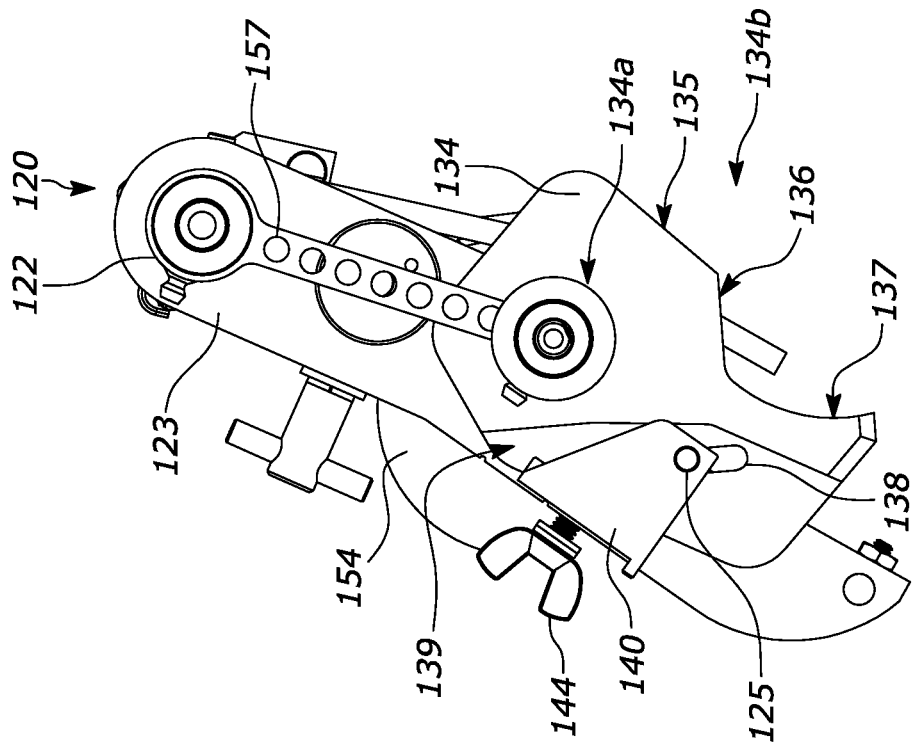
FIG. 17 illustrates a right side elevation view of the example processing assembly of FIGS. 4-16 in a first orientation in accordance with various embodiments.

As illustrated in FIGS. 11, 12, 14, 16, and 19, the cutting device 146 further includes an alignment member 158 having a body 159 and a groove 159a disposed therein. During operation of the shrimp processing machine 10, the body 159 may abut the shrimp 2 retained in the clamping mechanism 30 and the blade 154 may move to the lowered position by passing through the groove 159a of the alignment member 158 to cut the shrimp 2 (as illustrated in FIG. 16).

As previously noted, upon cutting the shrimp 2, any additional processing such as breaking the tail, separating the shrimp head, deveining, and/or cleaning may occur. These processing steps may occur either before or after the clamp mechanism 30 and the shrimp 2 reaches the adjustable cutting assembly 120.

Figure 21:
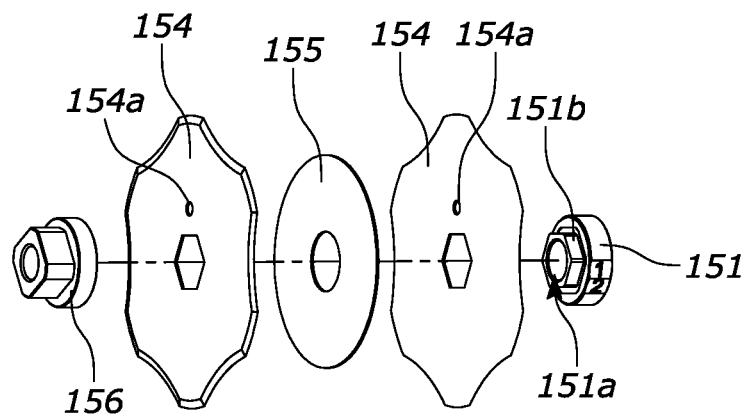
FIG. 21 illustrates a perspective view of a second example cutting device for use with the example shrimp processing assembly of FIGS. 1-19 in accordance with various embodiments.
Figure 22:
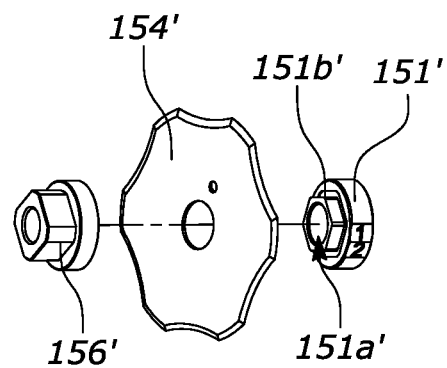
FIG. 22 illustrates a perspective view of a third example cutting device for use with the example shrimp processing assembly of FIGS. 1-19 in accordance with various embodiments.

With reference to FIGS. 19-22, the shrimp processing machine 10 may be used with a number of different exchangeable blades to provide desired cutting styles. To ensure the correct blade is used for a desired cut, the shrimp processing machine 100 uses different cutter blade adapters 151 that are specifically dimensioned for certain blades. More specifically, with reference to FIG. 20, a single blade 154 may be coupled with the cutter blade adapter 151. Notably, the single blade configuration can accommodate a shifted center line by using a spacer. With reference to FIG. 21, the cutter blade adapter 151 may be used with dual cutter blades 154 separated by a spacer 155. With reference to FIG. 22, the cutter blade adapter 151' may be used with a blade 154' having a larger diameter to perform different cuts therewith. In the illustrated example, the cutter blade adapter 151' has a blade coupling surface 151b' having a different shape and/or a larger external dimension (e.g., diameter) that mates with the respective blade 154' having a corresponding opening dimension (e.g., diameter). As a result, the blades 154, 154' may only be used with a specified cutter blade adapter 151, 151'.

In some examples, the profile of the engagement region 134b may be adjusted as desired to accommodate any number of desired shrimp cuts and styles. For example, the adjustable cam plate 134 may be machined such that the length and relative shapes of the first, second, and third engagement surfaces 135, 136, 137 produce a desired cut length and depth on the shrimp. As a result, a customer may create a customized cut as desired that differs from more conventional cut styles.

Figure 23:
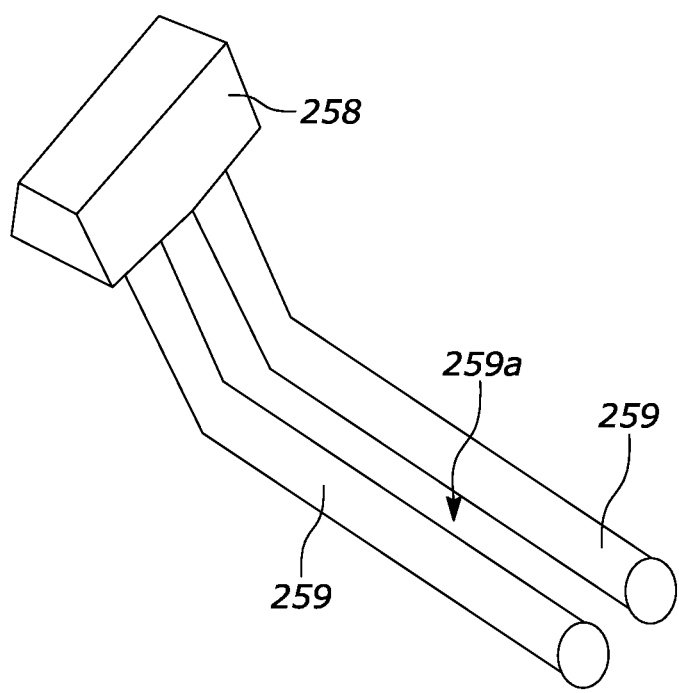
FIG. 23 illustrates an example alignment member for use with the example shrimp processing assembly of FIGS. 1-22 in accordance with various embodiments.

The shrimp processing machine 10 described herein may be constructed using any number of suitable alternative approaches. For example, FIG. 23 illustrates a second example alignment member 258. It is appreciated that the alignment member 258 illustrated in FIG. 23 may include similar features as the alignment member 158, and accordingly, elements illustrated in FIG. 23 are designated by similar reference numbers indicated in the embodiment illustrated in FIGS. 1-22 increased by 100. Accordingly, these features will not be described in substantial detail. Further, it is appreciated that any of the elements described with regards to the alignment member 158 may be incorporated into the alignment member 258.

In this example, the alignment member 258 includes a body 259 having a number of elongated fingers 260 extending therefrom. These elongated fingers may be constructed from bent tube steel or any other suitable material, and may either be formed integrally with the body 259 or coupled thereto via any number of suitable approaches (e.g., welding, adhesives, fasteners, and the like). The elongated fingers 260 define a gap 259a therebetween to receive the blade during operation of the machine. So configured, the alignment member 258 may be easily constructed and require minimal machining steps.

In accordance with the foregoing, a unique shrimp processing machine is efficiently adjustable to accommodate cutting, cleaning, and removing of shrimp meat of shrimp having different sizes. The adjustable nature of the machine can reduce processing times by requiring minimal effort to adjust the machine in a desired manner.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A shrimp processing machine comprising:
a frame assembly;
a drive assembly operably coupled with the frame assembly;
a bracket member operably coupled with the drive assembly, the bracket member including a body and a shrimp support region adapted to at least partially support at least a portion of a shrimp;
an adjustable cutting assembly including a cutting device and an adjustable cam plate operably coupled with the cutting device, the adjustable cam plate having a cam body, an adjustment mechanism, and an engagement region having a first engagement surface, a second engagement surface, and a third engagement surface, the adjustable cutting assembly being movable between a raised position and a lowered position;
wherein the adjustable cutting assembly is adjustable between a first configuration whereby the cutting device has a slow drop-in rate and a second configuration whereby the cutting device has a fast drop-in rate.

2. The shrimp processing machine of claim 1, wherein the first engagement surface and the second engagement surface cooperate to control the drop-in rate of the adjustable cutting assembly.

3. The shrimp processing machine of claim 2, wherein the second engagement surface is a generally planar surface extending from the first engagement surface at an angle.

4. The shrimp processing machine of claim 2, wherein the third engagement surface is adapted to control a duration the cutting device contacts the shrimp.

5. The shrimp processing machine of claim 2, wherein the third engagement surface is a generally curved surface extending from the second engagement surface.

6. The shrimp processing machine of claim 1, wherein the adjustment mechanism of the adjustable cam plate includes a slot having a first end and a second end.

7. The shrimp processing machine of claim 1, wherein the adjustable cutting assembly further includes a gear member operably coupled with the drive assembly, the gear member carrying a roller that selectively engages the engagement region of the adjustable cam plate to cause the cutting device to move between the raised and lowered positions.

8. The shrimp processing machine of claim 1, wherein the adjustable cutting assembly further includes an arm, the cutting device and the adjustable cam plate being operably coupled with the arm.

9. The shrimp processing machine of claim 1, wherein the adjustable cutting assembly further includes an alignment member having a body and a plurality of elongated fingers, the plurality of elongated fingers defining a gap therebetween to receive at least a portion of the cutting device when the adjustable cutting assembly is in the lowered position.

10. The shrimp processing machine of claim 1, wherein the shrimp support region of the bracket member includes a plurality of raised portions, the plurality of raised portions defining an opening therebetween to receive at least a portion of the cutting device when the adjustable cutting assembly is in the lowered position.

11. The shrimp processing machine of claim 10, wherein the shrimp support region includes a first end and a second end, wherein the first end has a first curvature and the second end has a second curvature.

12. The shrimp processing machine of claim 1, wherein the cutting device of the adjustable cutting assembly further includes a blade adapter to selectively couple a first blade or a second blade therewith.

13. An adjustable cutting assembly for a shrimp processing machine, the adjustable cutting assembly including:
a cutting device; and
an adjustable cam plate operably coupled with the cutting device, the adjustable cam plate having a cam body, an adjustment mechanism, and an engagement region having a first engagement surface, a second engagement surface, and a third engagement surface, the adjustable cutting assembly being movable between a raised position and a lowered position;
wherein the adjustable cutting assembly is adjustable between a first configuration whereby the cutting device has a slow drop-in rate and a second configuration whereby the cutting device has a fast drop-in rate.

14. The adjustable cutting assembly of claim 13, wherein the first engagement surface and the second engagement surface cooperate to control the drop-in rate of the adjustable cutting assembly.

15. The adjustable cutting assembly of claim 14, wherein the second engagement surface is a generally planar surface extending from the first engagement surface at an angle.

16. The adjustable cutting assembly of claim 14, wherein the third engagement surface is adapted to control a duration the cutting device contacts the shrimp.

17. The adjustable cutting assembly of claim 14, wherein the third engagement surface is a generally curved surface extending from the second engagement surface.

18. The adjustable cutting assembly of claim 13, wherein the adjustment mechanism of the adjustable cam plate includes a slot having a first end and a second end.

19. The adjustable cutting assembly of claim 13, further including a gear member carrying a roller that selectively engages the engagement region of the adjustable cam plate to cause the cutting device to move between the raised and lowered positions.

20. The adjustable cutting assembly of claim 13, further including an arm, the cutting device and the adjustable cam plate being operably coupled with the arm.

21. The adjustable cutting assembly of claim 13, further including an alignment member having a body and a plurality of elongated fingers, the plurality of elongated fingers defining a gap therebetween to receive at least a portion of the cutting device when the adjustable cutting assembly is in the lowered position.

22. A bracket member for a shrimp processing machine, the bracket member including:
a body; and
a shrimp support region adapted to at least partially support at least a portion of a shrimp, the shrimp support region including a plurality of raised portions that define an opening therebetween to receive at least a portion of a cutting device during operation of the shrimp processing machine, wherein the shrimp support region includes a first end and a second end, the first end having a first curvature and the second end having a second curvature.

* * * * *